United States Patent [19]

Sakai

[11] 4,139,015
[45] Feb. 13, 1979

[54] HYDRAULIC PRESSURE CONTROL DEVICE FOR USE IN AUTOMATIC TRANSMISSION

[75] Inventor: Takahiro Sakai, Toyota, Japan

[73] Assignee: Toyota Jidosha Kogyo Kabushiki Kaisha, Toyota, Japan

[21] Appl. No.: 709,220

[22] Filed: Jul. 27, 1976

[30] Foreign Application Priority Data

Sep. 25, 1975 [JP] Japan ................................ 50-114823

[51] Int. Cl.² ........................ B60K 41/00; F01B 7/20; F15B 13/042; G05D 11/02
[52] U.S. Cl. .................................... 137/115; 74/867; 91/173; 91/217; 91/461; 92/52; 192/109 F; 192/.075; 251/63.4
[58] Field of Search ............... 92/52, 84; 91/417, 173, 91/217, 461, 304, 167 R; 192/109 F, .075; 137/115, 885, 882; 251/63.4; 74/868, 867

[56] References Cited

U.S. PATENT DOCUMENTS

| | | | |
|---|---|---|---|
| 2,056,954 | 10/1936 | Bryant | 92/52 X |
| 2,944,488 | 7/1960 | Meyer | 92/52 X |
| 2,966,888 | 1/1961 | Jania et al. | 92/52 |
| 3,353,637 | 11/1967 | Chana | 92/52 X |
| 3,621,757 | 11/1971 | Bottoms | 91/417 R |
| 3,650,162 | 3/1972 | Leising et al. | 92/52 X |
| 3,672,243 | 6/1972 | Murakami et al. | 192/109 F |
| 3,740,506 | 6/1973 | Yoshioka et al. | 91/461 X |
| 3,809,201 | 5/1974 | Miyanishi et al. | 192/109 F |

FOREIGN PATENT DOCUMENTS 884606 7/1953 Fed. Rep. of Germany ............. 92/84

Primary Examiner—Irwin C. Cohen
Attorney, Agent, or Firm—Finnegan, Henderson, Farabow & Garrett

[57] ABSTRACT

A hydraulic pressure control device for use, for example, in an automatic transmission, in which a line pressure to be supplied from a hydraulic pressure source to a hydraulic pressure servo-device is controlled in three stages by means of a main spool which is displaced in a bleed-off valve of the line pressure by a subsidiary spool under a varying hydraulic control pressure. The subsidiary spool has at least one land forming a piston slidingly fitted in a movable sleeve having a closed end, the movable sleeve also forming a piston by being in turn slidingly fitted for limited movement in a stationary sleeve having a closed end. A first space between the outer wall of the closed end of the movable sleeve and the inner wall of the closed end of the stationary sleeve, and a second space within the piston chamber of the movable sleeve have ports for the introduction of hydraulic control pressure. A spring is confined between the subsidiary spool and the movable sleeve with an initial load for urging the movable sleeve away from the main spool and minimizing the first space. The initial load on the spring and the diameter of the spaces are so determined that an increasing hydraulic control pressure displaces only the spools until the product of the control pressure and the difference in the areas of the cross sections of the spaces exceeds the initial load on the spring. Further increase of the control pressure displaces both the movable sleeve and the subsidiary spool to the limit of movement of the movable sleeve, the movement of the spools being a function of the strain on the spring. Further increase of the control pressure acts to move only the subsidiary spool and thereby the main spool.

The control device preferably includes a second land on the subsidiary spool operating in an additional space of larger diameter in the movable sleeve and an annular space between the movable sleeve and the stationary sleeve. Both the additional space and the annular space are accessed to a second control pressure for additional displacement of the subsidiary spool and thereby of the main spool.

16 Claims, 4 Drawing Figures

HYDRAULIC PRESSURE CONTROL DEVICE FOR USE IN AUTOMATIC TRANSMISSION

BACKGROUND OF THE INVENTION

1. Field of the Invention

This invention relates to a hydraulic pressure control device for use, for example, in an automatic transmission, and more particularly to a hydraulic pressure control device which controls a hydraulic pressure or a line pressure to be supplied to a hydraulic servo means such as a clutch device and brake device adapted to provide given speed-change modes according to their selective actuations.

2. Description of the Prior Art

In general, a hydraulic line pressure is provided at a given or specified pressure level by means of a gear type hydraulic pump at a hydraulic-pressure regulating valve so as to be fed to a clutch or a brake. The minimum line pressure required for a clutch and brake varies nonuniformly, relative to the variation in the throttle openings. This nonuniform variation may be approximately classified into three stages of variations. On the other hand, the hydraulic line pressure should be slightly higher than the minimum hydraulic line pressure, for the purposes of providing smooth torque transmission for an automatic transmission as well as for saving the power required for the hydraulic pump.

However, the prior art hydraulic pressure control devices for use in an automatic transmission fail to provide smooth torque transmission and the saving in power required for the hydraulic pump, because of the failure to provide the desired variation from the minimum hydraulic line pressure.

SUMMARY OF THE INVENTION

It is accordingly a principal object of the present invention to provide a hydraulic pressure control device for use in an automatic transmission, which provides the desired variation in the minimum hydraulic line pressure and saves the power required for a hydraulic pump.

It is also a more broad object of this invention to provide a device for controlling an operation against a bias, such as a hydraulic line pressure, in three defined stages and as a function of the pressure of an actuating fluid fed to the device.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the three stage control device of this invention comprises a chamber having a closed end forming a first cylinder; a floating piston mounted in the first cylinder for limited translational movement, the head of the floating piston and the inner surface of the closed end of the chamber forming a first variable space; a second cylinder formed in the floating piston; an operating piston mounted in the second cylinder, the head of said operating piston forming a second variable space with the inner surface of the head of the floating piston; resilient means inter-acting between the operating piston and the floating piston and having an initial load for normally maintaining the first space at a minimum; means for admitting an actuating fluid pressure into the first and second spaces and means for applying the displacement of the operating piston, due to the fluid pressure, for controlling an operation against a bias; whereby, in the first stage, only said operating piston is displaced when the force of the effective pressure of said actuating fluid acting on said pistons does not exceed the initial load on said resilient means; in the second stage, the floating piston with said operating piston therein, is displaced through strain on the resilient means to the limit of the translational movement of the floating piston when said force continues to be increased above said initial load; and in said third stage, only said operating piston is displaced by further increased pressure of said actuating fluid.

It is preferred that the head of the floating piston be formed as a portion of the surface of a sphere for providing the first space at the minimum when the head of the floating piston is seated against the inner surface of the closed end of the chamber.

It is also preferred that the actuating fluid is a liquid and that the means for admitting the actuating fluid includes a port in the wall of the chamber opening into the first space and a port in the head of the floating piston interconnecting the first and second spaces.

It is still further preferred that the resilient means is a spring confined in the second space.

It is also preferred that the control device of the invention includes an annular collar fixed in the chamber for partially enclosing the other end of the first cylinder and wherein the translational movement of the floating piston is limited by abutting against the collar.

It is preferred that the operation to be controlled is a hydraulic line pressure, the operation including bleed-off means of the hydraulic line pressure and wherein the means for applying the displacement of the operating piston includes valve means in the bleed-off means, and wherein the increase in pressure of the actuating fluid tends to close the valve means and increase the line pressure.

It is still further preferred that the control device of the invention includes a shoulder in the wall of second cylinder forming a portion of the cylinder of larger diameter than said second space, an ancillary piston mounted in said larger portion attached to said operating piston, the head of the ancillary piston, the shoulder and the inner surface of the operating piston forming a third space, and port means for admitting fluid control pressure to the third space.

BRIEF DESCRIPTION OF THE DRAWINGS

The accompanying drawings, which are incorporated in and constitute a part of this specification, illustrate one embodiment of the invention and, together with the description, serve to explain the principles of the invention.

DESCRIPTION OF THE PREFERRED EMBODIMENTS

Reference will now be made in detail to the present preferred embodiment of the invention, examples of which are illustrated in the accompanying drawings.

The embodiments of the hydraulic pressure control device for use, for example, in an automatic transmission according to the present invention will be described in detail in conjunction with the accompanying drawings, hereunder.

In accordance with the invention, the pressure oil being supplied from a hydraulic pump (not shown) such as disclosed in the Japanese patent publication No. S48-41491 is regulated by means of a hydraulic pressure control device, the hydraulic line pressure $P_L$ thus regulated being fed to an engaging means of an automatic transmission (not shown) such as disclosed in the aforesaid Japanese patent publication No. S48-41491.

Figure 2:
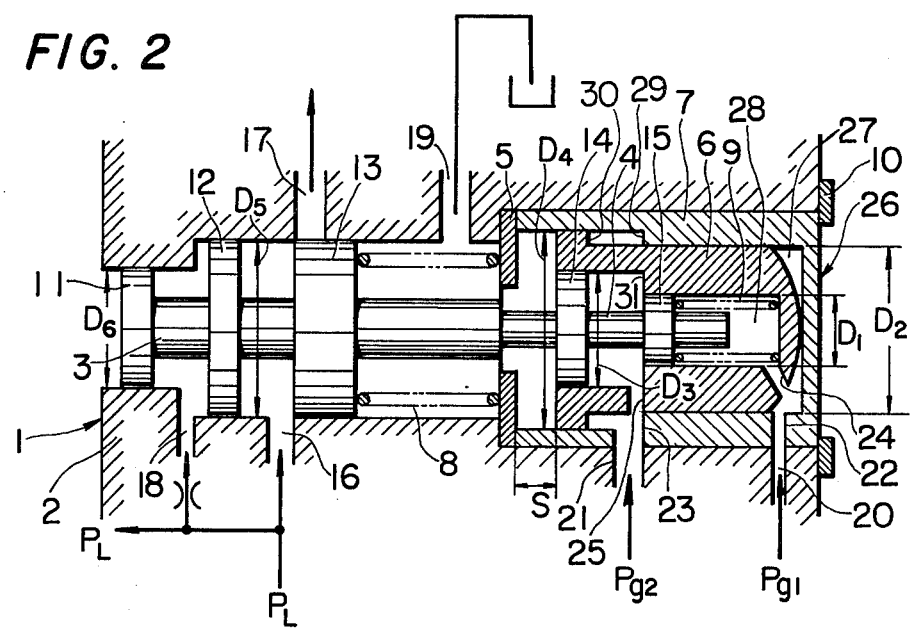
FIG. 2 is a longitudinal cross sectional view of one embodiment of a hydraulic pressure control device in an operation for controlling a line pressure according to the present invention.

As herein embodied, the hydraulic pressure control device 1, as shown in FIG. 2, includes a sleeve 2 which has an inlet 16 and and outlet 17 for, respectively, admitting and bleeding the pressure oil to and from the interior of the sleeve and two inlets 20, 21 for admitting a hydraulic control pressure into the sleeve for adjusting the amount of pressure oil being bled through the outlet 17. In addition, the sleeve 2 contains a drain port 19 and a port 18 adapted to equalize the pressures prevailing on the opposite sides of a land 12 to be described immediately hereinafter.

The control device 1 further includes a main spool 3 slidably placed within the sleeve 2 to form a valve in the bleed-off, having three lands 11, 12, 13, the land 11 having a diameter D6, and the other two lands having a diamter D5.

As embodied herein, an annular collar forming a stopper 5 is provided in the sleeve 2, with a main spring 8 confined between the land 13 and the stopper 5. A fixed outer sleeve 7, having one end closed, is placed in the sleeve 2 on the other side of the stopper 5 from the spring 8 and in contacting relation to the stopper to form a chamber in the sleeve 2. A shoulder portion 29 on the inner peripheral surface of the outer sleeve 7 provides two different diameters D4 and D2 for the cylindrical inner surface of the outer sleeve, the diameter D2 being smaller than the diameter D4. The outer sleeve 7 has two ports 22, 23 for admitting first and second hydraulic control pressures Pg1 and Pg2 therethrough, the control pressure Pg1 being actuated, for example, by the throttle and variable, and the control pressure Pg2 being actuated, for example, by the shift-into-reverse gear and normally constant. The control pressure Pg2 may, of course, also be variable as desired.

In accordance with the invention, a movable inner sleeve 6 having a closed end and two hollow portions continuous with each other is fitted into the outer sleeve 7, forming a floating piston in the chamber of the fixed outer sleeve 7. Slidably mounted in the inner sleeve 6 is a subsidiary spool 4, with its lands 14, 15 respectively fitted in the hollow portions, the land 15 being farther from the stopper 5. The hollow portions of the inner sleeve 6 and the lands 14, 15 of the spool 4 have diameters D3 and D1, respectively, the diameter D3 being larger than the diameter D1. A subsidiary spring 9 is confined between the land 15 and the wall of the closed end of the inner sleeve 6 and is so mounted therein as to be given an initial load. The outer surface of the closed end of the inner sleeve 6 has a curved surface in the form of a portion of a sphere defining a first space 27 with the closed end of the outer sleeve 7. The hollow portion of the inner sleeve 6, having the diameter D1, is referred as a second space 28. The land 15 forms an operating piston varying the volume of the second space 28 and the land 14 forms an ancillary piston varying the volume having the diameter D3.

The inner sleeve 6 further has ports 24, 25 which communicate with the inlets 20, 21 respectively. In this respect, the port 22 in the outer sleeve 7 is referred to as the first port, while the port 24 in the inner sleeve 6 is referred to as the second port. The port 25 is positioned to communicate with the hollow portion in the inner sleeve 6, having the diameter D3, while the port 24 communicates with the other hollow portion of space 28, having the diameter D1. The closed surface 26 of the outer sleeve 7 is secured through the medium of attaching members 10 to the end surface of the sleeve 2.

In addition, the subsidiary spool 4 may be integral with the main spool 3, or the subsidiary spool 4 may be a separate element. Even if the spools 3 and 4 are separate elements, they are kept in constant contact by the pressures of the spring 9 and the line pressure $P_L$.

In accordance with the invention, the land 13 of the main spool 3 is designed to tend to close the outlet 17 under the initial loads on the main spring 8 and the subsidiary spring 9 so as to maintain the line pressure $P_L$ appearing at inlet 16 in equilibrium, subject to adjustment by control hydraulic pressures admitted through the control ports 20, 21.

Description will now be given of the operations of the pressure control device according to the present invention.

When there is no line pressure $P_L$ being applied to the ports 16 and 18, the initial load on the springs 8, 9 will bias the valve land 13 of the spool 3 to the left closing the bleedoutlet 17.

However, as the line pressure $P_L$ builds up, but no hydraulic control pressure is supplied through the control ports 20, 21 the port 16 is maintained in communication with the port 17 as the forces of the main spring 8 and subsidiary spring 9 for biasing the main spool 3, as well as the subsidiary spool 4, in the direction to cause the land 13 to close the port 17 are brought into equilibrium with the hydraulic line pressure $P_L$ prevailing in the passage between the inlet 16 to the outlet 17. In this respect, the line pressure $P_L$ tends to bias the land 13 of the main spool to the right as viewed in FIG. 2, i.e., in the direction to open the port 17 and reduce the line pressure.

Due to the equilibrium of the pressures, the outlet 17 is kept open to a small extent, so that the resulting line pressure $P_L$ is maintained at the lowest prevailing level. However, as the hydraulic control pressure Pg1 for example, is being gradually increased by the opening of the throttle, the opening area of the outlet 17 will be decreased accordingly by the displacement of the land 13 to the left by the action of the subsidiary spool 4 on the main spool 3, i.e., in the direction to close the outlet 17, thereby tending to block the flow of fluid being bled through the outlet 17, thus increasing the line pressure.

The movements of the spools 3,4 are very small, particularly as compared to the movement of the inner sleeve 6, for maintaining a continuing equilibrium between the line pressure $P_L$ and the initial loads on the springs 8, 9 together with the control pressures Pg1 and Pg2, the difference being taken up by strain on the spring 9.

For simplicity, description will be had by referring to the first case where only the control pressure Pg1, responsive to the throttle opening, acts through port 20, and then the second case where both the control pressures Pg1 and Pg2 act through the ports 20 and 21, separately.

The First Case (Control Pressure Pg1 Only)

(i) The first stage

When the line pressure $P_L$ is being applied through port 18 to the left face of the land 12 tending to open the outlet port 17, and little or no control pressure Pg1 is being applied through the port 20, the closed curved end of the inner sleeve, or floating piston 6, will be forced against the closed end of the outer sleeve 7 by the bias of the line pressure $P_L$ and initial load $F_1$ on the spring 9 confined between the land 15 of the subsidiary spool 4 and the inner surface of the closed end of the inner sleeve 6.

Mathematically, in the first stage $$\frac{\pi}{4}(D_2^2 - D_1^2) Pg1 \leq F_1 \qquad (1)$$

and the force F urging the subsidiary spool 4 to the left tending to close the outlet port 17 is given by the expression:

$$F \frac{\pi}{4} D_1^2 \cdot Pg1 + F_1, \text{ and } \frac{\Delta F}{\Delta Pg1} = \frac{\pi}{4} D_1^2 \qquad (2)$$

assuming that the change in the load on the spring 9 with respect to the change in position of the land 15 with respect to the sleeve 6 is very small, which is true for all practicable usages.

In other words, as long as the product of the difference in the areas of the first and second spaces and the control pressure Pg1 is equal to or less than the initial load on spring 9, only the subsidiary spool 4, and thereby the main spool 3, will move to the left under the increasing Pg1. The dimensions of the spaces and the initial load on the spring 9 are established such that any movement of the spools to the left in the first stage is very small.

In accordance with the invention, in the first stage, linear increase of the control pressure Pg1 results in a very small correlative movement of the subsidiary spool 4 with the land 14, gradually closing the outlet 17 and the linear increase in the line pressure $P_L$. This linear increase in the line pressure $P_L$ is shown schematically in the graph of FIG. 1 as the first ramp A of the dotted line. This linear increase in line pressure is in contrast to the nonuniform minimum required increase of line pressure during the same period, as shown by the solid line in the graph.

(ii) The second stage

When the product of the difference in the areas of the cross sections of the first and second spaces and the control pressure Pg1 equal to or more than the initial load $F_1$ on the subsidiary spring 9, the floating piston 6 begins to compact the spring 9 and to move left away from the closed end of the chamber formed by the outer sleeve 7 as the control pressure increases. The floating piston 6 will carry with it the auxiliary spool 4, thus further moving the land 13 of the main spool 3 also to the left and further closing the outlet 17 and increasing the line pressure $P_L$.

The spring 9 acts as a resilient barrier between the movement of the floating piston 6 and the spools 3,4, depending on the spring constant and the strain on the spring. The movement of the spools will be relatively much less than the movement of the floating piston, i.e. the inner sleeve 6.

The movement of the land 13 to the left during the second stage will continue until the sleeve 6 abuts the stopper 5.

Mathematically in the second stage $$\frac{\pi}{4}(D_2^2 - D_1^2) Pg1 \geq F_1 \text{ and} \qquad (3)$$

$$\frac{\pi}{4}(D_2^2 - D_1^2) Pg1 \leq F_1 + KS$$

wherein K represents the spring constant of spring 9 and S represents the movable stroke of the inner sleeve acting on the spring 9. The constant value KS thus reflects the varying load on the spring 9, over and above the initial load $F_1$, as the floating piston 6 moves between its farthest right position abutting the outer sleeve 7 and its farthest left position abutting the collar 5.

Figure 1:
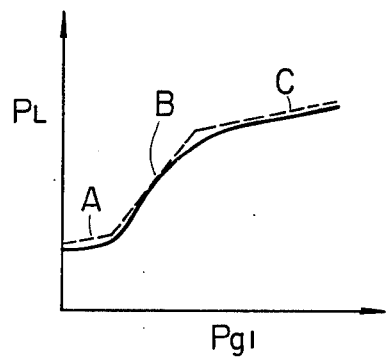
FIG. 1 is a graph illustrative of the relationship between the minimum line pressures and the desired line pressures for a hydraulic pressure servo-device for an automatic transmission.

The selection of the values of K and S will be affected by the amount of relative movement desired in the spools 3,4 in changing the line pressure $P_L$ and in determining the relative length of the section B of the graph of FIG. 1. It may be desirable, for example, to utilize a spring with a relatively low spring constant combined with a relatively long movement of the inner sleeve 6. The movement of the spools 3,4 would thus be minimized with respect to the movement of the floating piston 6.

The force F urging the inner sleeve 6 and the subsidiary spool 4 to the left tending to close the outlet port 17 is given by the expression $$F = \frac{\pi}{4} D_2^2 \cdot Pg1 \text{ and } \frac{\Delta F}{\Delta Pg1} = \frac{\pi}{4} D_2^2 \qquad (4)$$

During the second stage ($\Delta F / \Delta Pg1$) will be at its maximum.

(iii) The third stage

When the floating piston 6 abuts the stopper 5, further increase of the control pressure Pg1 will be effective only against the area of the land 15, having the cross sectional area of the second space. Cosequently the auxilliary spool 4 and the land 13 will be moved to the left during further increase of Pg1 substantially as in the first stage, as shown by ramp C of FIG. 1.

Mathematically, in the third stage $$\frac{\pi}{4}(D_2^2 - D_1^2) Pg1 \geq F_1 + KS \qquad (5)$$

and the force F urging the subsidiary spool 4 to the left tending to close the port 17 further is given by the expression:

$$F = \frac{\pi}{4} D_1^2 \cdot Pg1 + F_1 \text{ and } \frac{F}{\Delta Pg1} = \frac{\pi}{4} D_2^2. \qquad (6)$$

As is apparent from the foregoing $\Delta F/\Delta Pg1$ may be varied in three stages as the control pressure Pg1 is increased by the increasing opening of the throttle. p
The second case (Control pressure Pg1 and Pg2)

In the second case, both the control pressure Pg1, responsive to the throttle opening, and the control pressure Pg2 by the shifting-into-reverse gear, act on the auxiliary spool 4. As is well known, reverse gear requires a higher line pressure, in general, than the forward running conditions.

The control pressure Pg2, which is normally substantially constant, is admitted through the port 21: (1) into the annular space between the inner sleeve 6 and the outer sleeve 7 due to the shoulder 29, and (2) through the port 25 in the inner sleeve 6 into the hollow portion of the sleeve 6 having the larger diameter D3.

The control pressure Pg2 entering the annular area around the sleeve 6 will, therefore, act against the shoulder 29 formed between the diameters D4, D2 of the inner surface of the outer sleeve 7 and a flange 30 of the same depth as the shoulder 29 formed at the open end of the inner sleeve 6 to having sliding contact with the inner surface of the sleeve 7 having the larger diameter D4.

The control pressure Pg2 entering the hollow portion of the inner sleeve 6 having the larger diameter D3, will act against the shoulder 31 formed between the diameters D1, D3 of the inner surface of the sleeve 6 and the opposing face of the land 14 of the auxiliary spool 4.

The effect of the control pressure Pg2 if constant, is to move the auxiliary spool 4, and the land 13 to the left a given distance and to increase the line pressure $P_L$ a fixed amount. The contours of the ramps A, B and C of FIG. 1 remain the same, but the entire graph is shifted upwardly to reflect the constant increase of the line pressure due to the control pressure Pg2.

In the second case, therefore, depending on the dimensions of the lands, i.e., the diameters D1, D2, D3 and D4, three different combinations of parameters exist, as follows:

(a) In the combination wherein the area of the flange 30 equal to or less than the area of the shoulder 31, and there is a net force due to Pg2 tending to urge sleeve 6 toward the closed end of cylinder 7, i.e., $$\frac{\pi}{4}(D_4^2 - D_2^2) \leq \frac{\pi}{4}(D_3^2 - D_1^2);$$

In the first stage:

$$\frac{\pi}{4}(D_2^2 - D_1^2) Pg1 \leq F_1 + \frac{\pi}{4}(D_3^2 - D_1^2 - D_4^2 + D_2^2) Pg2;$$

$$F = \frac{\pi}{4} D_1^2 Pg1 + \frac{\pi}{4}(D_3^2 - D_1^2) Pg2 + F_1 \text{ and}$$

$$\frac{\Delta F}{\Delta Pg1} = \frac{\pi}{4} D_1^2$$

In the second stage:

$$\frac{\pi}{4}(D_2^2 - D_1^2) Pg1 \geq F_1 + \frac{\pi}{4}(D_3^2 - D_1^2 - D_4^2 + D_2^2) Pg2 \text{ and}$$

$$\frac{\pi}{4}(D_2^2 - D_1^2) Pg1 \leq F_1 + \frac{\pi}{4}(D_3^2 - D_1^2 - D_4^2 + D_2^2) Pg2 + KS,$$

$$F = \frac{\pi}{4} D_2^2 Pg1 + \frac{\pi}{4}(D_4^2 - D_2^2) Pg2 \text{ and } \frac{\Delta F}{\Delta Pg1} = \frac{\pi}{4} D_2^2$$

In the third stage:

$$\frac{\pi}{4}(D_2^2 - D_1^2) Pg1 \geq F_1 + \frac{\pi}{4}(D_3^2 - D_1^2 - D_4^2 + D_2^2) Pg2 + KS,$$

$$F = \frac{\pi}{4} D_1^2 Pg1 + \frac{\pi}{4}(D_3^2 - D_1^2) Pg2 + F_1 + KS \text{ and}$$

$$\frac{\Delta F}{\Delta Pg1} = \frac{\pi}{4} D_1^2$$

The action of the control pressure Pg2 increases the force F by $\pi/4(D_3^2-D_1^2) \cdot Pg2$ for the first and third stages and by $\pi/4(D_4^2-D_2^2) \cdot Pg2$ for the second stage, while the value $\Delta F/\Delta Pg1$ varies in three stages depending on the variation in the level of the control pressure Pg1 as in the first case.

(b) In the combination wherein the force on the area of the flange 30 is more than the force on the area of the shoulder 31 and less than the amount of the force on the area of the shoulder 31 and $F_1$ and KS, that is, where there is a net force due to Pg2 acting to urge sleeve 6 away from the closed end of cylinder 7, i.e., $$\frac{\pi}{4}(D_4^2 - D_2^2) Pg2 > \frac{\pi}{4}(D_3^2 - D_1^2) Pg2 \text{ and}$$

$$\frac{\pi}{4}(D_4^2 - D_2^2) Pg2 < \frac{\pi}{4}(D_3^2 - D_1^2) Pg2 + F_1 + KS$$

In the first stage:

$$\frac{\pi}{4}(D_4^2 - D_2^2 - D_3^2 + D_1^2) Pg2 + \frac{\pi}{4}(D_2^2 - D_1^2) Pg1 \leq F_1$$

In the third stage:

$$\frac{\pi}{4}(D_4^2 - D_2^2 - D_3^2 + D_1^2) Pg2 + \frac{\pi}{4}(D_2^2 - D_1^2) Pg1 \geq F_1 + KS$$

The second stage represents the intermediate condition between the first stage and the third stage. Although reversing the relative sizes of the flange 30 and shoulder 31 affects the time at which the sleeve 6 starts to move away from the closed end of the cylinder 7 and the time the sleeve 6 abuts the stopper 5, as the control pressure Pg1 increases, the same mathematical relationship for F and $\Delta F/\Delta Pg1$ as in the three stages in the case (a) may be obtained.

(c) In the combination wherein the force on the area of the flange 30 exceeds the force on the area of the shoulder 31 plus the initial load on the spring 9 and KS, i.e., $$\frac{\pi}{4}(D_4^2 - D_2^2) \cdot Pg2 \geq \frac{\pi}{4}(D_3^2 - D_1^2) \cdot Pg2 + F_1 \text{ and } KS,$$

the inner sleeve 6 is urged against the stopper 5 at all times, representing the condition in the third stage, while the same mathematical relationships F and $\Delta F/\Delta Pg1$, as those in the third stage of the case (a) may be obtained. It is apparent that such a combination of diameters and pressure Pg2 would have a more limited utility.

Even under the action of a constant control pressure Pg2, $\Delta F/\Delta Pg1$ may be varied in three stages, depending on the levels of the control pressure Pg1, except in combination 3 above.

As can be seen from the foregoing description, the characteristics of the line pressure $P_L$ may be varied in three stages. This is because the subsidiary spring 9 is interposed between the inner sleeve 6 and the subsidiary spool 4, while the movement of the inner sleeve 6 is restricted by the presence of the stopper 5.

Figure 3:
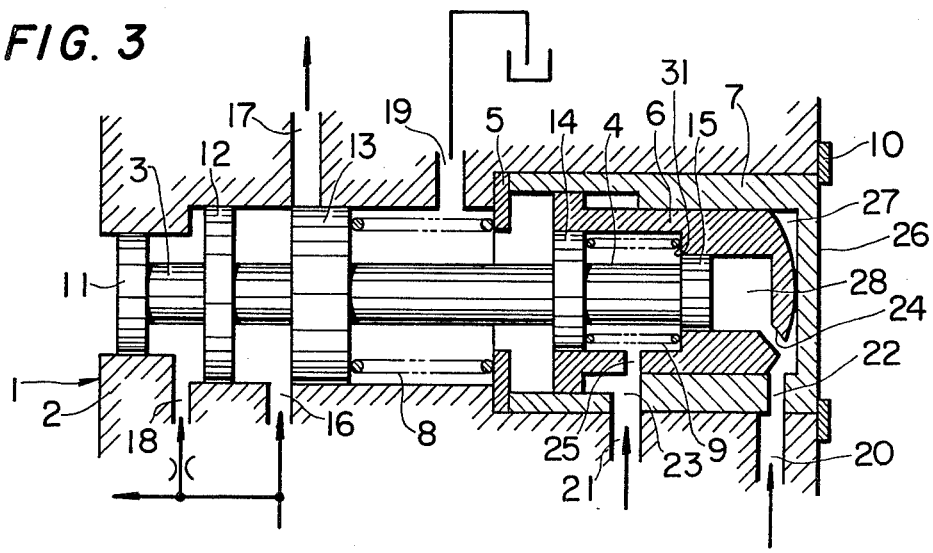
FIG. 3 is a longitudinal cross sectional view of another embodiment of the hydraulic pressure control device according to the present invention.
Figure 4:
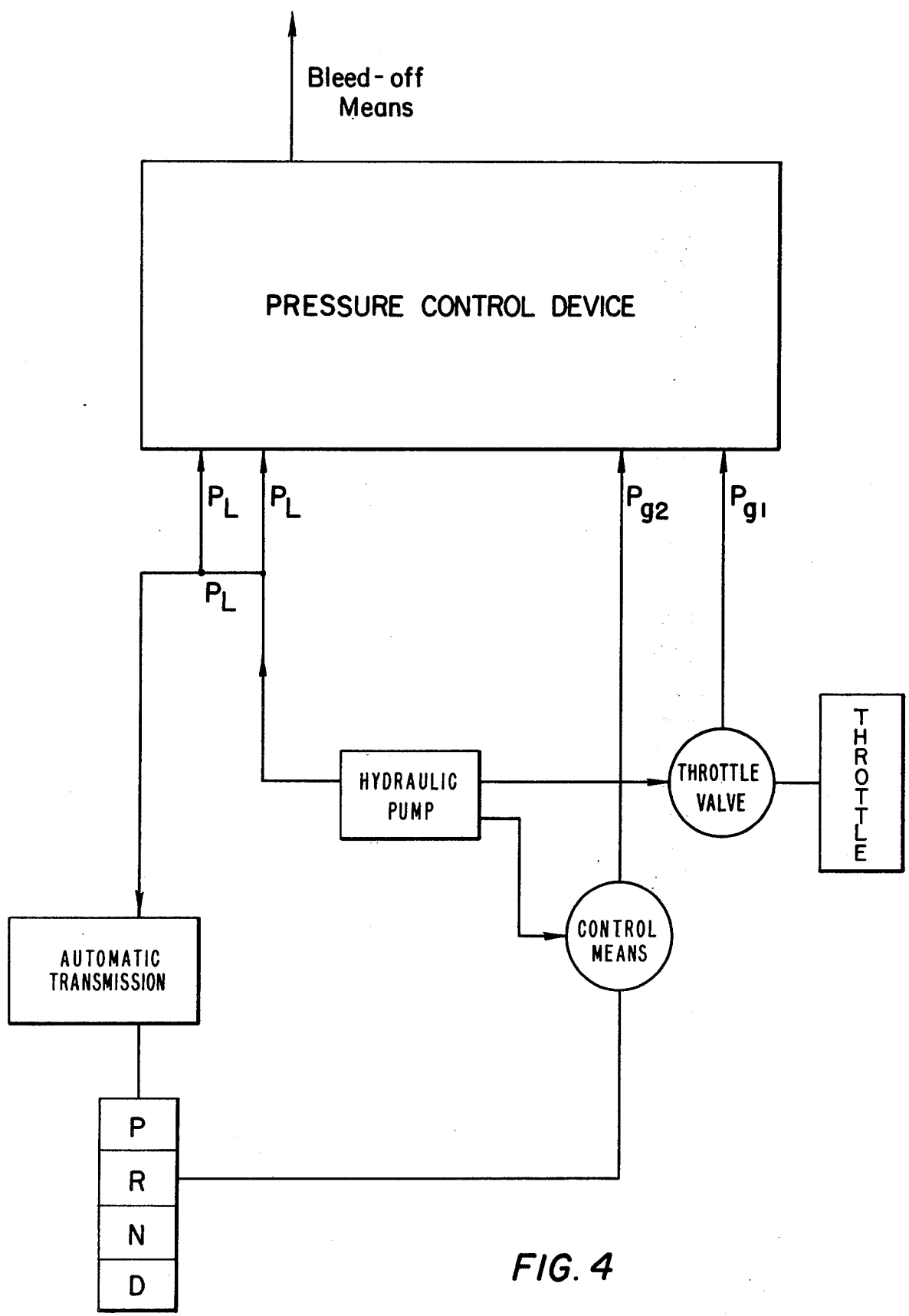
FIG. 4 is a schematic representation of the relationship of the hydraulic pressure control device of FIG. 1 to the actuating fluid sources and the automatic transmission.

FIG. 3 shows another embodiment of the control device according to the present invention, in which the subsidiary spring 9 is confined between the land 14 and the inner shoulder portion 31 of the inner sleeve 6.

In FIG. 2, the diameter of the auxiliary spool 4 is shown as less than the diameter of the main spool 4 wherein in FIG. 3 the diameters are the same. It is apparent that, in either case, the relative diameters of the spools do not affect the mathematical relationships developed above. Likewise, as previously stated, the spools 3 and 4 may be separate elements or integrated together without affecting the results of the control device of the invention.

As is apparent from the foregoing description, the line pressure may be controlled depending on the flow rates of the fluid being bled through the port 17, whose opening area varies depending on the varying lengths of strokes of the subsidiary spool 4, and hence those of the main spool 3.

As a result, there may be achieved improved torque transmission as well as increased efficiency of power used in a hydraulic pump.

Although the control device of the invention has been described in the environment of controlling the line pressure to be supplied to a hydraulic pressure servo-device of an automatic transmission, it is apparent that its utility is not so limited. The control device of the invention may be used for controlling any operation against a bias in three stages as a function of a control pressure. It is also apparent that the control pressure may be any fluid pressure, although hydraulic pressure is preferred.

It will be apparent to those skilled in the art that various modifications and variations could be made in the fluid-actuated control device of the invention without departing from the scope or spirit of the invention.

What is claimed is:

1. A device actuated by and responsive to the pressure of an actuating fluid varying in direct relationship to a throttle opening for controlling an operation against a bias means, the control being in three defined stages as a function of the actuating fluid pressure, comprising:

a chamber having a closed end forming a first cylinder;

a floating piston mounted in said first cylinder for limited translational movement, the head of the floating piston, formed as a portion of the surface of a sphere and the inner surface of the closed end of the chamber forming a first variable space, the chamber having a first opening proximate the closed end for admitting actuating fluid into the first space;

a second cylinder formed in said floating piston and having a substantially smaller diameter than said first cylinder;

an operating piston mounted in said second cylinder, the head of said operating piston forming a second variable space with the inner surface of the head of said floating piston, and the head of said floating piston having a second opening proximate the first opening for admitting actuating fluid into the second space from the first space and for permitting actuating fluid to act simultaneously on the heads of both said pistons, said operating piston being displaced as a function of the volume of both said first and second variable spaces;

resilient means in said second space interacting between said operating piston and said floating piston and having an initial load for normally maintaining said first space at a minimum;

fluid pressure bias means acting in opposition to said resilient means;

rigid connecting means interposed between said fluid pressure biasing means and said operating piston; and means for applying the displacement of said operating piston against said bias means, wherein in the first stage, only said operating piston is displaced when actuating fluid pressure simultaneously acting on said pistons does not exceed the initial load on said resilient means; in the second stage, said floating piston with said operating piston therein is displaced to the limit of the translational movement of the floating piston when actuating fluid pressure is increased above the initial load on said resilient means; and in the third stage, only said operating piston is displaced by further increase in actuating fluid pressure.

2. The device of claim 1 wherein said resilient means is a spring positioned in said second space between the head of said operating piston and the inner surface of the head of said floating piston.

3. The device of claim 1 also including an annular collar fixed in said chamber for partially enclosing the other end of said first cylinder and wherein the translational movement of said floating piston is limited by abutting against said collar.

4. The device of claim 1 wherein the displacement of said operating piston controls hydraulic line pressure in a pressure line having a bleed-off means and wherein said means for applying the displacement of said operating piston includes valve means in said bleed-off means wherein an increase in actuating fluid pressure tends to displace said operating piston to close said valve means and increase said line pressure.

5. A device actuated by and responsive to at least one of the pressures of first and second actuating fluids for controlling an operation against a bias, the control being in three defined stages as a function of the actuating fluid pressures, comprising:

a chamber having a closed end forming a first cylinder;

a floating piston mounted in said first cylinder, the head of the floating piston and the inner surface of the closed end of the chamber forming a first variable space, the chamber having a first port proximate the closed end for admitting first actuating fluid into the first space;

an annular collar fixed in said chamber and partially enclosing the other end of said first cylinder, said closed end and said collar limiting translational movement of said floating piston;

a second cylinder formed in said floating piston;

an operating piston mounted in said second cylinder, the head of said operating piston forming a second variable space with the inner surface of the head of said floating piston, and the head of said floating piston having a second port proximate the first port for admitting first actuating fluid into the second space from the first space and for permitting first actuating fluid to act simultaneously on the heads of both said pistons;

a spring interacting between said operating piston and said floating piston and having an initial load for normally maintaining said first space at a minimum;

fluid pressure bias means acting in opposition to said spring;

a shoulder formed in the wall of said second cylinder providing a portion of said second cylinder of larger diameter than said second space;

an ancillary piston mounted in said larger portion of said second cylinder and coaxial with said operating piston forming a third variable space between said ancillary piston and the combined areas of said shoulder and the inner surface of said operating piston, the walls of said chamber and the wall of said larger portion of said second cylinder having aligned openings forming a third port for admitting a second actuating fluid into said third space, said operating and ancillary pistons being displaced as a function of the volume of said first, second and third variable spaces;

means rigidly interconnecting said ancillary piston and said operating piston; and means for applying the displacement of said operating piston and said ancillary piston for controlling an operation.

6. The hydraulic device of claim 5 also including a shoulder in the wall of said first cylinder forming a portion of said first cylinder of larger diameter than said first space, and an annular flange on the circular wall of said floating piston in sliding contact with the surface of said enlarged portion of said first cylinder, the surfaces of said shoulder in the wall of said first cylinder, of said flange and of said larger portion of said first cylinder forming an annular space around said floating piston, said third port admitting said second actuating fluid to said annular space.

7. The device of claim 6 wherein the displacement of said operating and ancillary pistons controls hydraulic line pressure in a pressure line having a bleed-off means and wherein said means for applying the displacement of said operating piston and said ancillary piston includes valve means in said bleed-off means, wherein an increase in first or second actuating fluid pressure tends to close said valve means and increase said line pressure.

8. The device of claim 7 including first actuating fluid pressure which varies in direct relationship to a throttle opening and second actuating fluid pressure which is conducted to said third port on shifting a transmission to reverse and is substantially constant.

9. A hydraulic pressure control device actuated by and responsive to the pressure of an actuating fluid for use in an automatic transmission comprising:

a first sleeve;

spool valve means having at least one land slidingly fitted in said first sleeve for controlling a bleed-off means of a hydraulic line pressure being fed from a hydraulic pressure source to a hydraulic servo-device by displacement of said land;

a stationary sleeve having an inner circular cross section and a closed end rigidly fitted in said first sleeve;

an inner sleeve having a closed end slidingly fitted in said stationary sleeve, the closed ends of said stationary sleeve and said inner sleeve and the inner curved wall of said stationary sleeve forming a first space;

an annular stopper fixed in said first sleeve partially closing the other end of said stationary sleeve, said stopper limiting the movement of said inner sleeve;

a hollow cylinder formed in said inner sleeve, the closed end of said inner sleeve forming a closed end of said cylinder;

a subsidiary spool having at least one land slidingly mounted in said hollow cylinder, said land of said subsidiary spool, the closed end of said cylinder and the wall of said cylinder forming a second space;

means rigidly interconnecting said subsidiary spool and said spool valve means for displacing said land of said spool valve means by the displacement of said subsidiary spool;

a first spring confined between said land of said spool valve means and said annular stopper;

a second spring confined between a land of said subsidiary spool and said inner sleeve, said second spring having an initial load for normally maintaining said inner sleeve in a position to minimize said first space;

fluid pressure bias means acting in opposition to said springs; and aligned ports in said first sleeve and said stationary sleeve, and a port interconnecting said first and second spaces for admitting actuating fluid to said first and second spaces, wherein when actuating fluid is fed into said first and second spaces, then said subsidiary spool is displaced according to a first level of actuating fluid pressure until actuating fluid pressure exceeds said initial load, said inner sleeve and said subsidiary spool are displaced when actuating fluid pressure is further increased according to a second level of pressure, and said subsidiary spool is then only displaced when actuating fluid pressure is further increased according to a third level of pressure so that the hydraulic line pressure may be controlled for the different actuating fluid pressure levels according to the displacement of the land of said spool valve means.

10. The hydraulic pressure control device of claim 9 wherein said means rigidly interconnecting said subsidiary spool and said spool valve means include a projecting core of a spool of said spool valve means and a projecting core of said subsidiary spool.

11. The hydraulic pressure control device of claim 10 wherein said projecting cores abut each other.

12. The hydraulic pressure control device of claim 10 wherein said projecting cores form an integrated element.

13. The hydraulic pressure control device of claim 10 wherein said projecting cores have the same diameter.

14. The hydraulic pressure control device of claim 9 also including a shoulder in the wall of the hollow cylinder formed in said inner sleeve, said shoulder forming a portion of said cylinder of larger diameter than said second space, a second land on said subsidiary spool slidingly fitted in said enlarged portion of said cylinder, and port means for admitting actuating fluid into the space inwardly of said second land in said hollow cylinder.

15. The hydraulic pressure control device of claim 14 wherein said second spring is confined between said second land and said shoulder of said inner sleeve.

16. The hydraulic pressure control device of claim 9 wherein said second spring is confined in said second space.

* * * * *